United States Patent [19]

Roxy

[11] Patent Number: 5,026,033
[45] Date of Patent: Jun. 25, 1991

[54] UNIVERSAL SYSTEM FOR THE SUPPORT AND POSITIONING OF A WORKPIECE

[75] Inventor: Frank W. Roxy, Utica, Mich.

[73] Assignee: The Budd Company, Troy, Mich.

[21] Appl. No.: 569,745

[22] Filed: Aug. 20, 1990

Related U.S. Application Data

[63] Continuation of Ser. No. 440,594, Nov. 22, 1989, abandoned.

[51] Int. Cl.⁵ .............................................. B25B 1/00
[52] U.S. Cl. ...................................... 269/45; 269/71; 269/309; 269/900
[58] Field of Search .................... 269/45, 71, 100, 228, 269/900, 99, 91, 93, 94, 88, 309, 303, 315; 254/133 A

[56] References Cited

U.S. PATENT DOCUMENTS

| | | | |
|---|---|---|---|
| 979,305 | 12/1910 | Hunt | 269/45 |
| 1,001,619 | 8/1911 | Coffin . | |
| 1,313,061 | 8/1919 | Brown | 269/45 |
| 1,450,709 | 4/1923 | Bayles | 254/133 A |
| 1,465,330 | 8/1923 | Ardner | 269/45 |
| 1,670,253 | 5/1928 | Gilbert et al. | 269/45 |
| 2,342,179 | 2/1944 | Ciesa et al. . | |
| 2,655,188 | 10/1953 | Catching, Jr. . | |
| 2,779,092 | 1/1957 | Gordon . | |
| 2,917,015 | 12/1959 | Henderson . | |
| 3,175,820 | 3/1965 | Schiler | 269/900 |
| 3,681,834 | 8/1972 | Seidenfaden . | |
| 3,711,082 | 1/1973 | Seidenfaden . | |
| 3,829,978 | 8/1974 | Basin et al. . | |
| 4,121,817 | 10/1978 | Pavlovsky . | |
| 4,125,251 | 11/1978 | Jamieson | 269/45 |
| 4,157,819 | 6/1979 | Meyer | 269/900 |
| 4,183,511 | 1/1980 | Marek . | |
| 4,400,969 | 8/1983 | Specktor . | |
| 4,502,457 | 3/1985 | Marron . | |
| 4,522,380 | 6/1985 | Peddle . | |
| 4,579,271 | 4/1986 | Fujita et al. . | |
| 4,583,712 | 4/1986 | Wilks | 254/133 A |
| 4,641,819 | 2/1987 | Poland . | |
| 4,682,766 | 7/1987 | Barkley . | |
| 4,683,633 | 8/1987 | Loris . | |
| 4,684,113 | 8/1987 | Douglas et al. . | |
| 4,685,661 | 8/1987 | Slocum et al. . | |
| 4,768,698 | 9/1988 | Brown et al. . | |
| 4,819,922 | 9/1989 | Bolke | 269/900 |
| 4,828,240 | 5/1989 | Longenecker et al. | 269/900 |
| 4,867,427 | 9/1989 | Cunningham | 269/900 |

FOREIGN PATENT DOCUMENTS 764351 12/1956 United Kingdom .

OTHER PUBLICATIONS

Five photographs of fixture made by Milford Fabricating Company (1988).
Lakeside Enterprises, Inc., "The Improved Universal Gauging System", 8 pages (undated).

Primary Examiner—Robert C. Watson
Attorney, Agent, or Firm—Harness, Dickey & Pierce

[57] ABSTRACT

Disclosed is a universal system for the support and positioning of a workpiece for use with a device such as an inspection system. A plurality of individual alignment devices are inserted into predetermined holes of a platform having a matrix of holes. Functions of individual alignment devices include support, clamping, datum point positioning and providing reference points. Each alignment device usually includes stanchions of varying length. Each stanchion is capable of being connected to another stanchion. Once the alignment device is positioned in a hole it can be fine tuned in all directions to get an exact location. Workpieces of widely varying types, shapes and sizes can thus be positioned using the same set of alignment devices.

18 Claims, 8 Drawing Sheets

UNIVERSAL SYSTEM FOR THE SUPPORT AND POSITIONING OF A WORKPIECE

This is a continuation of U.S. patent application Ser. No. 07/440,594, filed Nov. 22, 1989 now abandoned.

BACKGROUND OF THE INVENTION

1. Technical Field

This invention relates qenerally to workpiece holders and, more particularly, to a method and apparatus for supporting and positioning of a workpiece for use in an inspection system incorporating an inspection probe.

2. Discussion

To use an inspection system to measure a workpiece it is highly beneficial and, for the most part, a requirement that the workpiece being inspected is positioned in a high precision inspection configuration and maintained in that position.

The conventional workpiece holder for an inspection system generally uses a single type of positioning device at a variety of locations on the workpiece. Moreover, the positioning devices are usually specially made for a specific workpiece and cannot be used for other workpieces. In other words, conventional workpiece positioning and holding devices lacked universality in that a single set of positioning devices could not be used for virtually any shape or size of workpiece.

U.S. Pat. No. 4,641,819 to Poland discloses a jig assembly for holding a variety of workpieces for assembly or machining processes. Individual workpiece positioners are permanently attached to a base portion in a matrix configuration. Each positioner can be raised or lowered, and can reach points within a certain range by rotating a tip around three axes A, B and C. It appears that the workpiece rests on a supporting ledge adjacent the tip. This patent suffers the drawbacks of not being truly universal. Further, one axis cannot be adjusted without affecting the other two.

U.S. Pat. No. 3,681,834 to Seidenfaden discloses a fixing and tensioning system for workpieces to be mechanically processed. A template is used over a platform having a uniform rectangular grid. The template indicates the positions for modular units for supporting different workpieces. The modular units are not adjustable on three axes to provide true universality of the system.

British Patent No. 764,351 discloses a jig assembly for supporting motor vehicle body shells of differing sizes. A series of location units are arranged on a platform having a number of places for securing the units. The units can be moved to other locations on the platform to support other sized vehicle frames. The location units do not appear to be adjustable.

Another workpiece support and positioning device manufactured by the Milford Fabricating Company, a division of the assignee of this invention, is known in the art. This device comprises a plurality of individual support elements positionable at different locations on a platform.

This invention eliminates the above-described problems as well as many others. Up until now a truly universal workpiece positioning and supporting system was not known. This invention enables ease of change from one workpiece to another using the same set of holding and positioning devices.

SUMMARY OF THE INVENTION

An apparatus made in accordance with the teachings of the present invention includes a set of adjustable alignment devices positioned in a predetermined arrangement on a platform. The platform includes a matrix of threaded holes in which the alignment devices are removably inserted. By inserting the alignment devices in different holes and then providing three-dimensional positional adjustments of a contact head on each device, a number of widely varying workpieces can be positioned using the same set of alignment devices.

In the preferred embodiment, each alignment device is built from a plurality of reusable and interchangeable elements which are interconnected together to provide unique functions. These functions include support, clamping, datum locating and providing reference points. Many of the alignment devices have at least one element in common, preferably posts or stanchions. Stanchions come in varying lengths and can be connected together. Most of the alignment devices are adjustable in three independent axes, in which one axis can be adjusted without affecting the other two. The versatility of the alignment devices provides a support and positioning system which is truly universal.

BRIEF DESCRIPTION OF THE DRAWINGS

These and other advantages of the present invention will become apparent to those skilled in the art after studying the following text and by reference to the drawings in which.

DETAILED DESCRIPTION OF THE PREFERRED EMBODIMENTS

Figure 1:
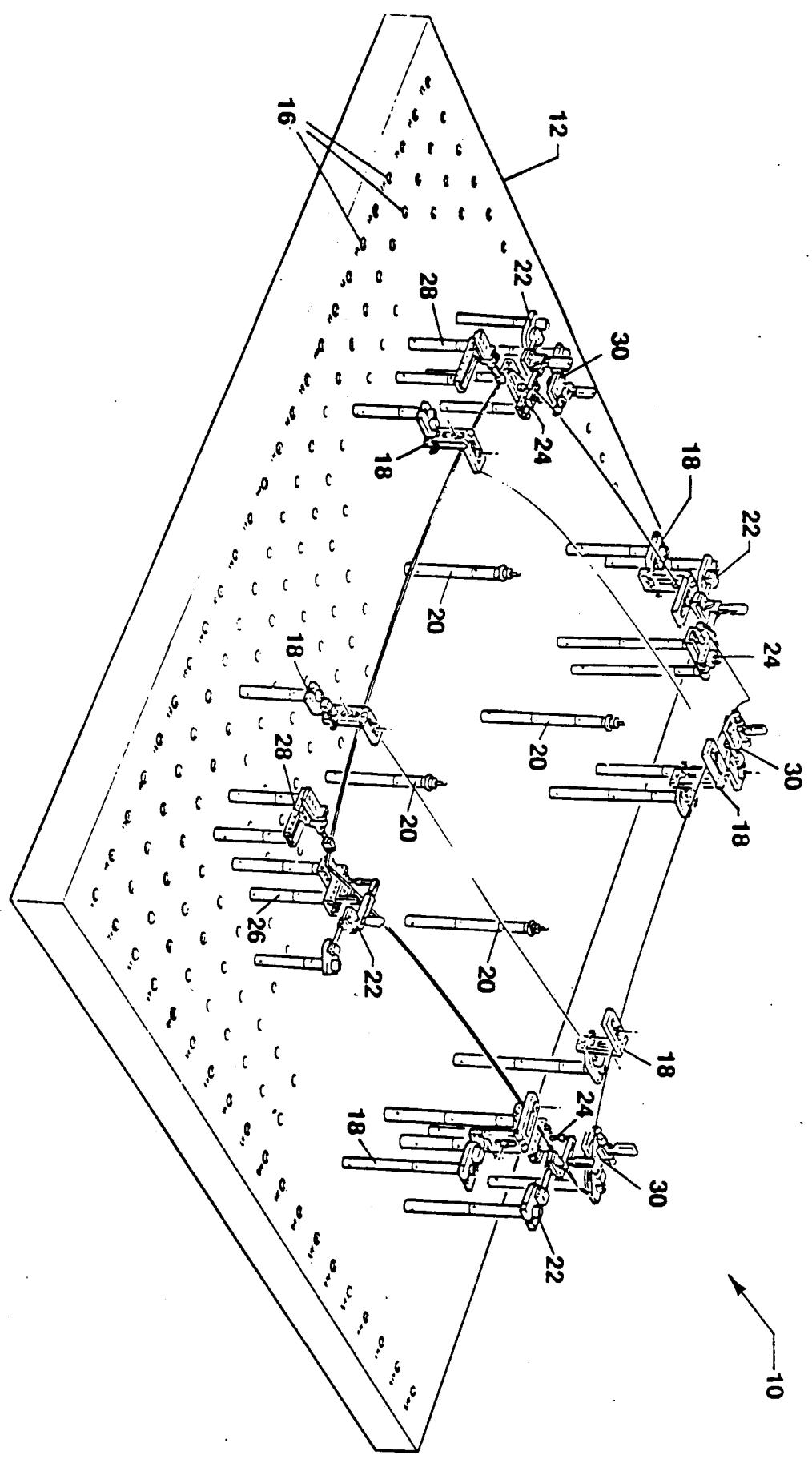
FIG. 1 is a perspective view which illustrates a set of alignment devices supporting and positioning a specific workpiece.

FIG. 1 shows the preferred embodiment of the workpiece supporting apparatus 10 of the present invention. In this embodiment a workpiece 14, in this case a hood for an automobile, is shown being supported and positioned by a plurality of alignment devices. The alignment devices are threaded into holes 16 of a platform 12. The threaded holes 16 in the platform 12 are arranged in a predetermined matrix having an adequate distance from each other such that the alignment devices can position virtually any size and shape workpiece. In the preferred embodiment, holes 16 are arranged in a rectangular array spaced 100 mm apart. As can be seen from FIG. 1, the workpiece 14 is positioned in a body position, i.e., the position it would be in in normal use.

As can be readily noticed from FIG. 1, the alignment devices provide different types of functions. Alignment devices 18 provide reference points (described below) for an inspection probe used with computerized inspection equipment such as a digimatic indicator (not shown). Alignment devices 20 provide support for the workpiece at specific datum points. Alignment devices 22 provide a clamping function by holding down the top of the workpiece. A second alignment device is generally used as a support at a specific datum point beneath the clamping alignment devices 22. In FIG. 1, alignment devices 24 and 26 act as an A datum locator and an A and C datum locator, respectively, with clamping alignment devices 22. Alignment devices 28 are used as B or C datum locators. These alignment devices keep the workpiece 14 at a specific transverse location. In FIG. 1, alignment devices 30 pushes the workpiece against a B or C datum locator (e.g. 26 or 28).

The positioning of the alignment devices in the platform 12 of FIG. 1 is for the specific workpiece 14 shown. It can be readily apparent that each alignment device can be easily removed from the threaded hole in which it is in and put into another hole. As will become apparent, most of the individual alignment devices have a contaot portion contacting the workpiece which can be adjusted in all three X, Y and Z axes after they are positioned in one or more of the holes. Each alignment device has a sufficient range of movement of the contact portion that it is possible to place it at any location along the platform 16. Therefore, the alignment devices are truly universal and can virtually support and position any workpiece for inspection.

Figure 2:
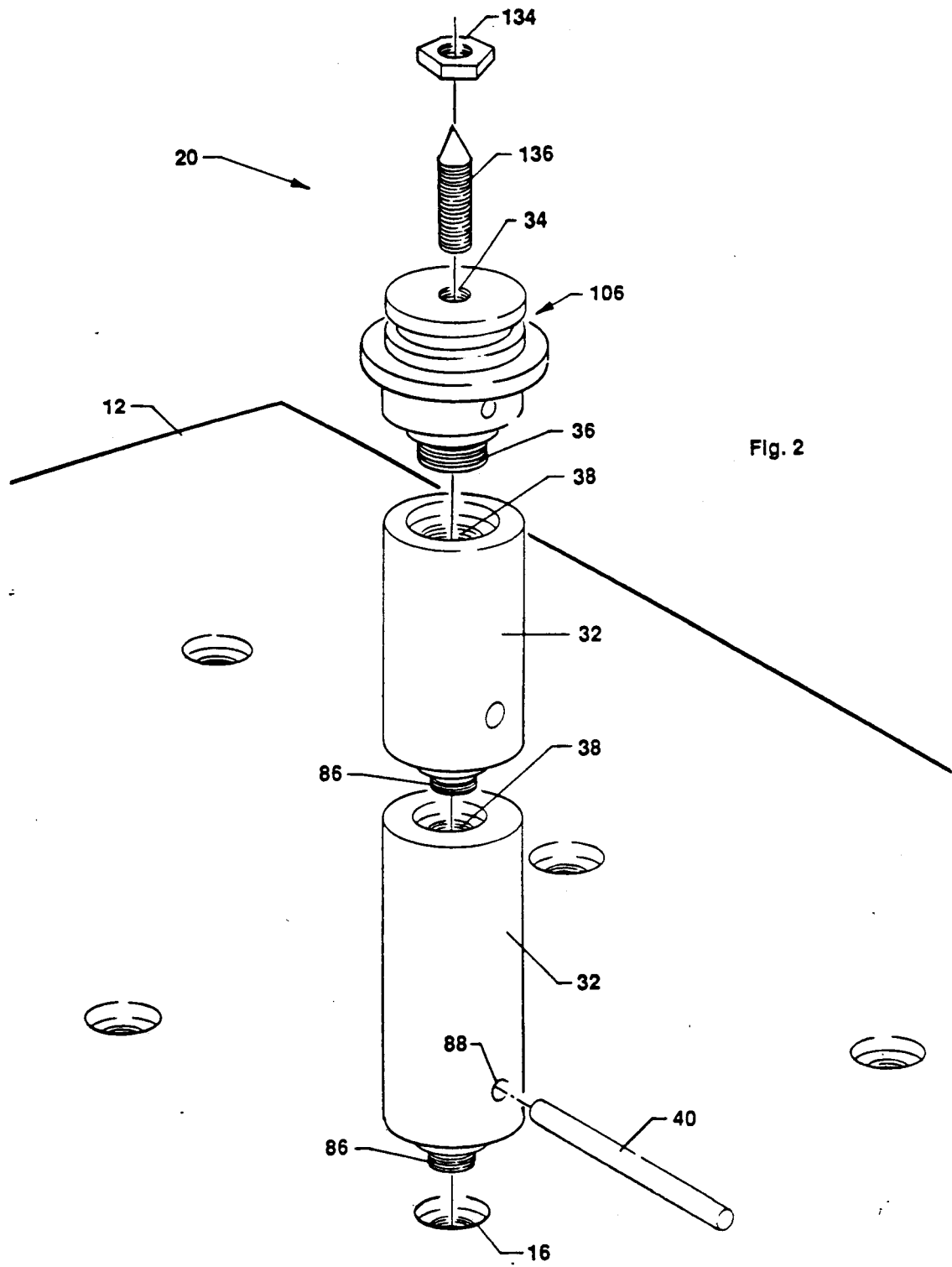
FIG. 2 is an exploded perspective view which illustrates one of the alignment devices used for support.

Now turning to FIG. 2, support alignment device 20 is shown in more detail. As can be seen, stanchion 32 is threaded into a hole 16 of platform 12 at the desired support location. Threaded tip portion 86 of stanchion 32 is inserted into hole 16 and finger tightened. Rod 40 is then inserted into hole 88 of stanchion 32 to further tighten it into hole 16. Stanchion 32 has an upper end with an internal threaded bore 38. Either another stanchion 32 can be inserted into this threaded bore 38 by means of tip portion 86, or end cap 106 can be threaded into the bore 38. Stanchions 32 are provided in varying lengths. Therefore, many different heights can be accessed by a contact portion or tip 136. Also, the end of tip 136 can be manufactured into a variety of different shapes, such as a tip having a flat surface, an angled surface, a rounded surface, etc. End cap 106 also has an internal threaded bore 34. Into that bore is threaded support tip 136. Once the exact height of alignment device 20 is determined, nut 134 secures the tip 136 at this location. Device 20 is thus typically used for support of the workpiece, usually at a specific control point.

Figure 3:
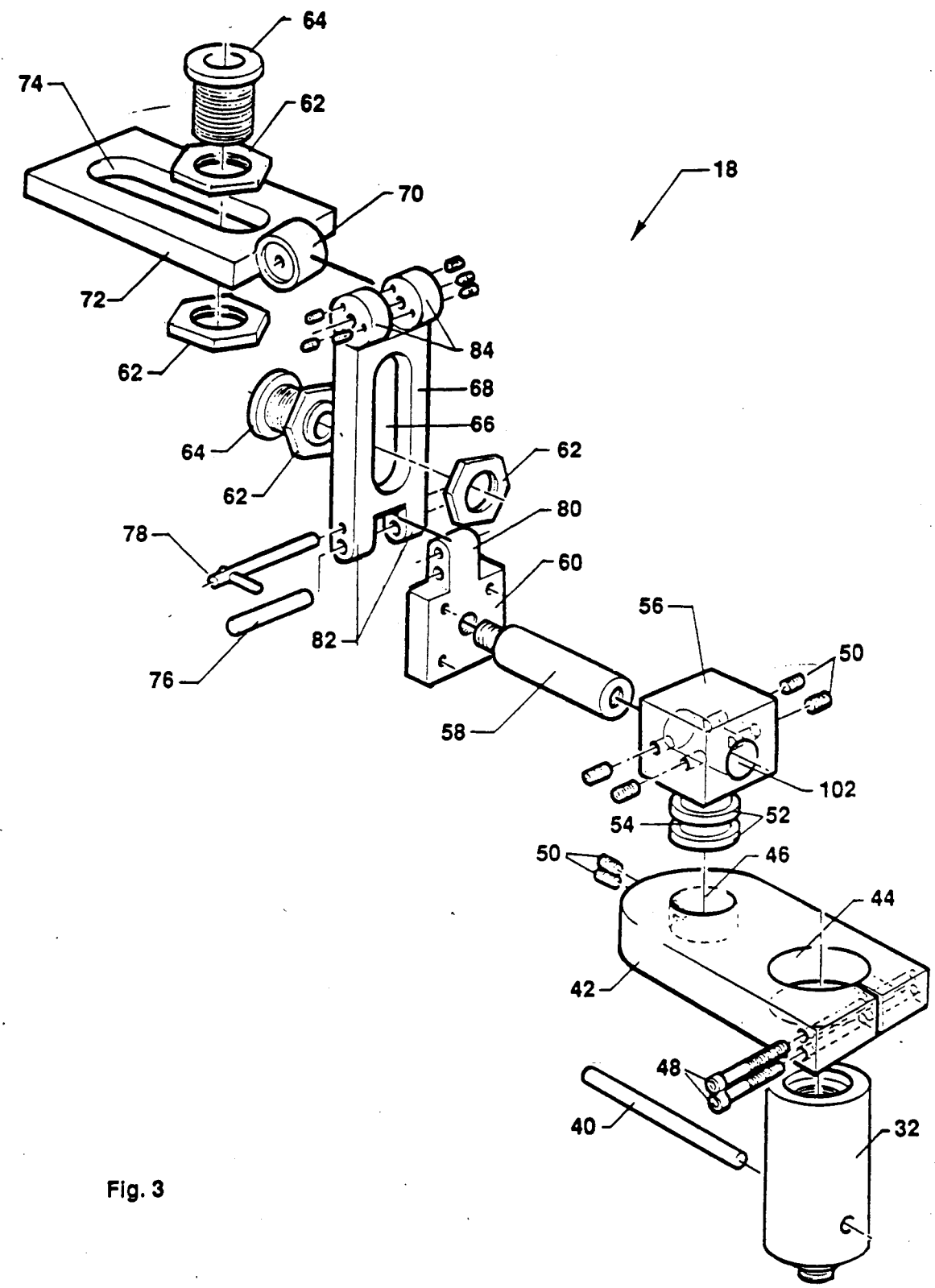
FIG. 3 is an exploded perspective view which illustrates one of the alignment devices for use as a reference point.

FIG. 3 shows the referencing alignment device 18. The stanchion 32 is used to bring a referencing point to nearly the height desired. The upper end of stanchion 32 is inserted into hole 44 at one end of a horizontal clamping member 42. Bolts 48 are then inserted as shown, and tightened to clamp the clamping member 42 to the stanchion 32. At the other end of the horizontal clamping member 42 is another hole 46. A projection from a horizontal rotating member 56 is inserted into hole 46. Horizontal rotating member 56 can be rotated 360° in a plane parallel to the plane of the horizontal clamping member 42. The projection has two flanges 52 which define groove 54. Once the projection is in hole 46, set screws 50 are inserted through the horizontal clamping member 42 into groove 54, as shown, to secure the horizontal rotating member 56 into place. The horizontal rotating member 56 has a horizontally extending hole 102 through it. An extension rod 58 is inserted into hole 102 and secured by set screws 50 as shown. Extension rod 58 can be rotated about its axis 360° before being secured in a specific location by set screws 50. The extension rod 58 is threaded on its inside and has an outward threaded tip at one end. The end having the threaded tip is threaded into a vertical support element 60 as shown. The vertical support element 60 has a tab 80 on one side. The tab 80 is inserted between projections 82 of a vertical positioning member 68. A rod 76 is inserted through the projections 82 of the vertical positioning member 68 and through the tab 80 to secure the twb together A locking key 78 locks the vertical positioning member 68 in a vertical position. At the other end of the vertical positioning member 68 are two other projections 84. A tab 70 from a horizontal positioning member 72 is inserted between projections 84 to secure the horizontal positioning member 72 to the vertical positioning member 68. Set screws as shown secure the two together in a specific angular configuration relative to a plane of the workpiece. Both the vertical positioning member 68 and the horizontal positioning member 72 have slots 66 and 74, respectively. Both of these slots hold separate reference bushings 64. The reference bushings are secured to the slot using nuts 62, as shown.

In operation, the reference alignment device 18 is adjusted by the above mentioned elements to bring the reference bushings 62 to predetermined positions relative to workpiece 14. The alignment device 18 does not touch the workpiece. A probe from an inspecton system (not shown) is inserted into the two reference bushings 64 in order to determine referencing dimensions for measuring the dimensions of the workpiece 14. Once the reference dimension is determined by the probe and recorded, the locking key 78 can be removed and the positioning members 68 and 72 holding the reference bushings 64 can be moved away from workpiece 14.

Figure 4:
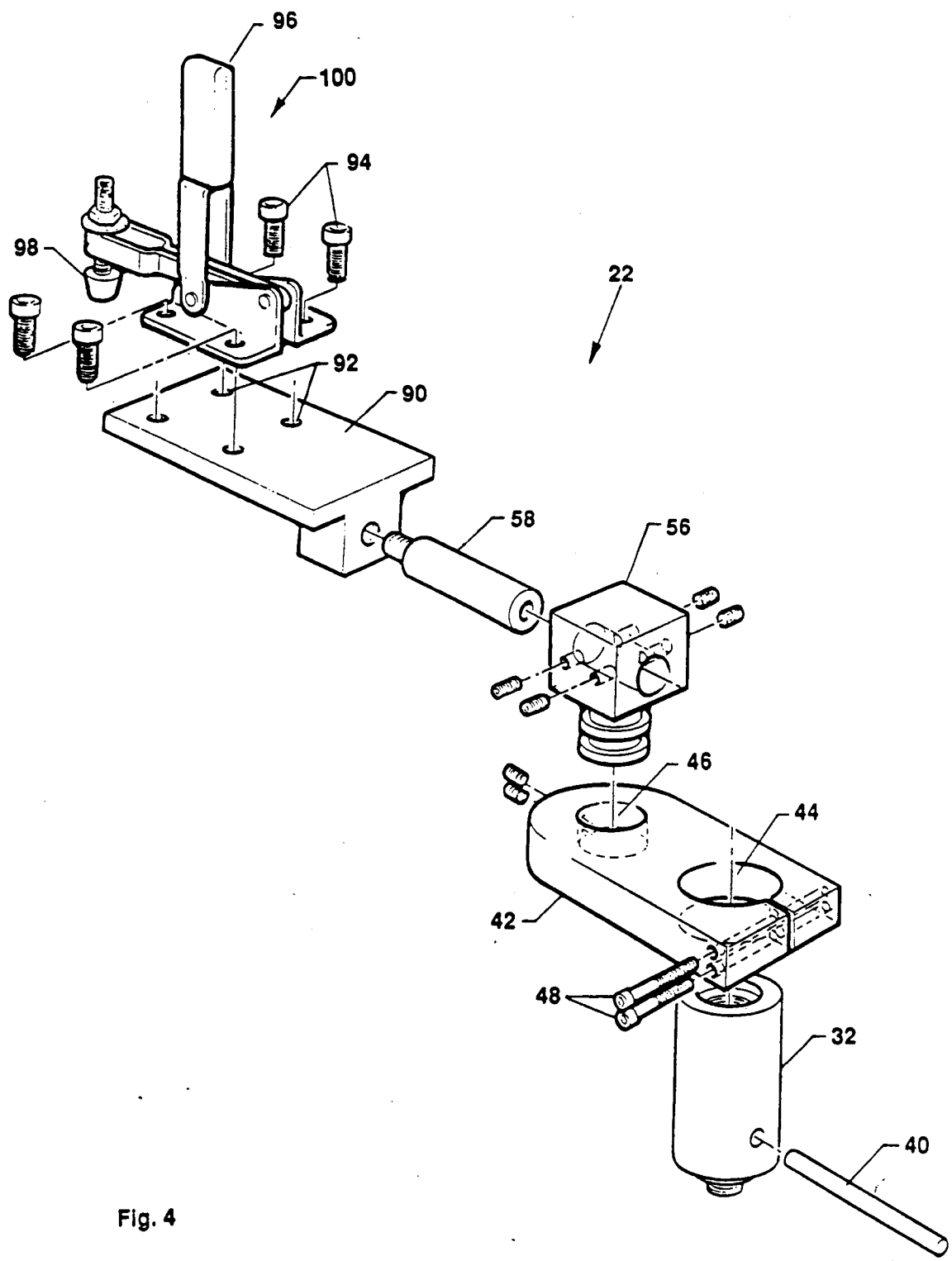
FIG. 4 is a exploded perspective view which illustrates one of the alignment devices for use as a clamp.

Turning to FIG. 4, an alignment device 22 generally used as a clamp is shown. The compbnents or elements of this device are the same as the alignment device 18 of FIG. 3 from the support stanchion 32 to the extension rod 58 Inserted onto the horizontal extension rod 58 of the alignment device 22 is a horizontal support plate 90. Horizontal support plate 90 has a number of holes 92 in which a commercially available locking device 100 is secured in place by bolts 94, as shown.

In operation, the clamping alignment device 22 is positioned in a hole 16 at the point which clamping is desired. A tip 98 of clamping device 22 should be clamped at an appropriate point on the workpiece to avoid any skewing forces on the workpiece, i.e., at a point where the tip is perpendicular to a plane of the workpiece. To do this, extension rod 58 and horizontal rotating member 56 are rotated to appropriate positions. Before positioning the alignment device 22, lever 96 of the locking device 100 is pulled back such that tip 98 is loose. Once the desired position is attained, lever 96 is then pushed into an upright position forcing tip 98 down into the position as shown in FIG. 4 locking the tip 98 into a clamping arrangement against the workpiece. Clamping device 22 is generally used with an A datum locator, as shown in FIG. 1. Similarly, the clamping device 100 can be replaced by a clamping device (also commercially available) shown generally at 30 of FIG. 1. This clamping device is generally used with a B or C datum locator, as shown in FIG. 1.

Figure 5:
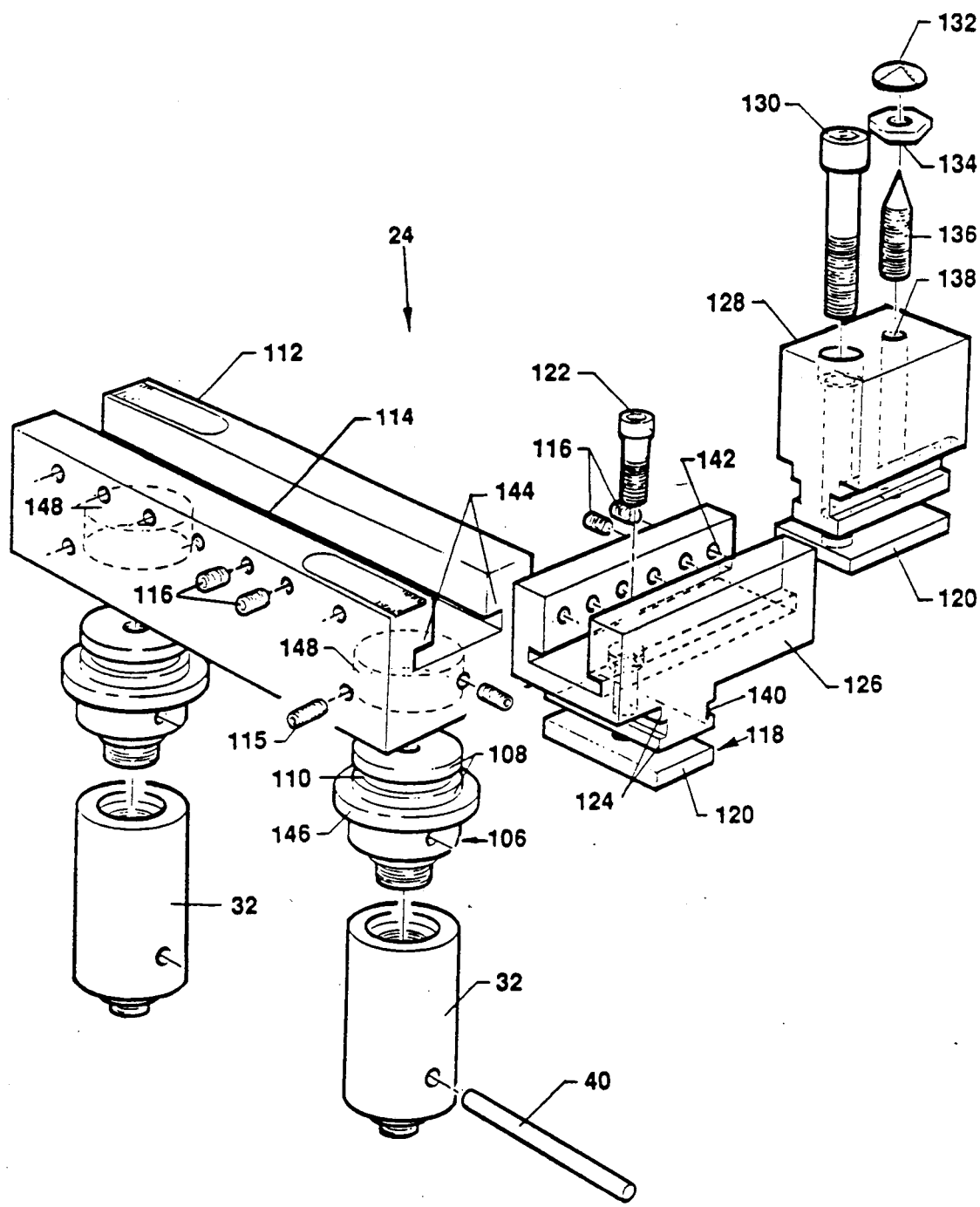
FIG. 5 is an exploded perspective view which illustrates an alignment device which is used as an A datum locator.

Turning now to FIG. 5, A datum locator alignment device 24, generally used underneath clamping alignment device 22 of FIG. 4 is shown. As can be seen, this alignment device generally uses two stanchions. The stanchions 32 have end caps 106 threaded into their upper ends as in FIG. 2. A bridging member 112 is secured to both end caps 106. The end caps 106 are inserted into recesses 148 until flange 146 is flush with the bottom of bridging memeber 112. Set screws 115 are secured within groove 110 formed by flanges 108. The bridging member 112 has a horizontal dovetail retaining slot 114 all the way across it. This slot 114 enables a sliding assembly 126 to be positioned anywhere alonq slot 114. The sliding assembly 126 has a projection 118 extending downwardly from it. This projection has a sliding plate 120 secured to it by means of bolt 122. The projection 118 also has flanges 124 forming a groove 140. Sliding assembly 126 also has a horizontal dovetail retaining slot 142. This retaining slot is for sliding assembly 128. Sliding assembly 128 has the same type of projection 118 as sliding assembly 126. Sliding assembly 128 has a threaded hole in its upper face in which a vertical supporting tip 136 is inserted. Vertioal supportinq tip 136 is threaded into hole 138 to the desired distanoe and looked there by nut 134. A rest cap 132 is then positioned at the end of the vertical supporting tip 136.

In operation, the A datum alignment device 24 is positioned in two threaded holes 16 at nearly the desired location. The proximate Z position is determined by the length and number of stanchions 32. Once this position is set, fine tuning of the X, Y and Z direction can be accomplished by the above-described elements. Once the horizontal direction (e.g. X direction) along slot 114 of bridging member 112 is determined, sliding assembly 126 is locked in place by two methods. First, bolt 122 secures sliding plate 120 to sliding assembly 126 in a loose fashion before being inserted into the dovetail horizontal retaining slot 114. Once the sliding assembly 126 is in the desired location in slot 114, bolt 122 is tightened, drawing sliding plate 120 up flush against flange 144 represented by the dovetail slot 114. The bottom portion of sliding assembly 126 is then tightened against the top of the bridging member 112. Set screws 116 are then tightened into grcove 140 to further secure assembly 126 in slot 114. Sliding assembly 128 is secured in dovetail retaining slot 142 of sliding assembly 126 in the same manner, to move tip 136 in a horizontal direction (e.g. Y direction) perpendicular to the horizontal direction (e.g. X direction) of the slot 114 in bridging member 112. Bolt 130 retains assembly 128 into sliding assembly 126. Vertical positioning tip 136 provided the fine tuning in the Z direction. Since the A datum alignment device 24 is often used with the clamping alignment device 18, there may be substantial pressure put against tip 136 and may provide damage to the workpiece 14. Rest cap 132 provides a wider base in which to clamp against. Further, extension rod 58 can be used to extend the vertical distance of tip 136. The threaded end portion of rod 58 can be threaded into hole 138. Tip 136 is then threaded into the threaded hole at the opposite end of rod 58.

By the arrangement shown in FIG. 5 it can be realized that virtually any point within the range of the alignment device can be supported by tip 136. The range of the alignment device is sufficiently large that every point in the X-Y platform plane can be accessed by tip 136 by the appropriate selection of mounting holes 16 and fine tuning adjustment provided by the unique construction of the adjustable elements of the alignment devices. Also, when adjusting one axis, the other two axes are not disturbed. Thus, high precision adjustment of one axis can be performed.

Figure 6:
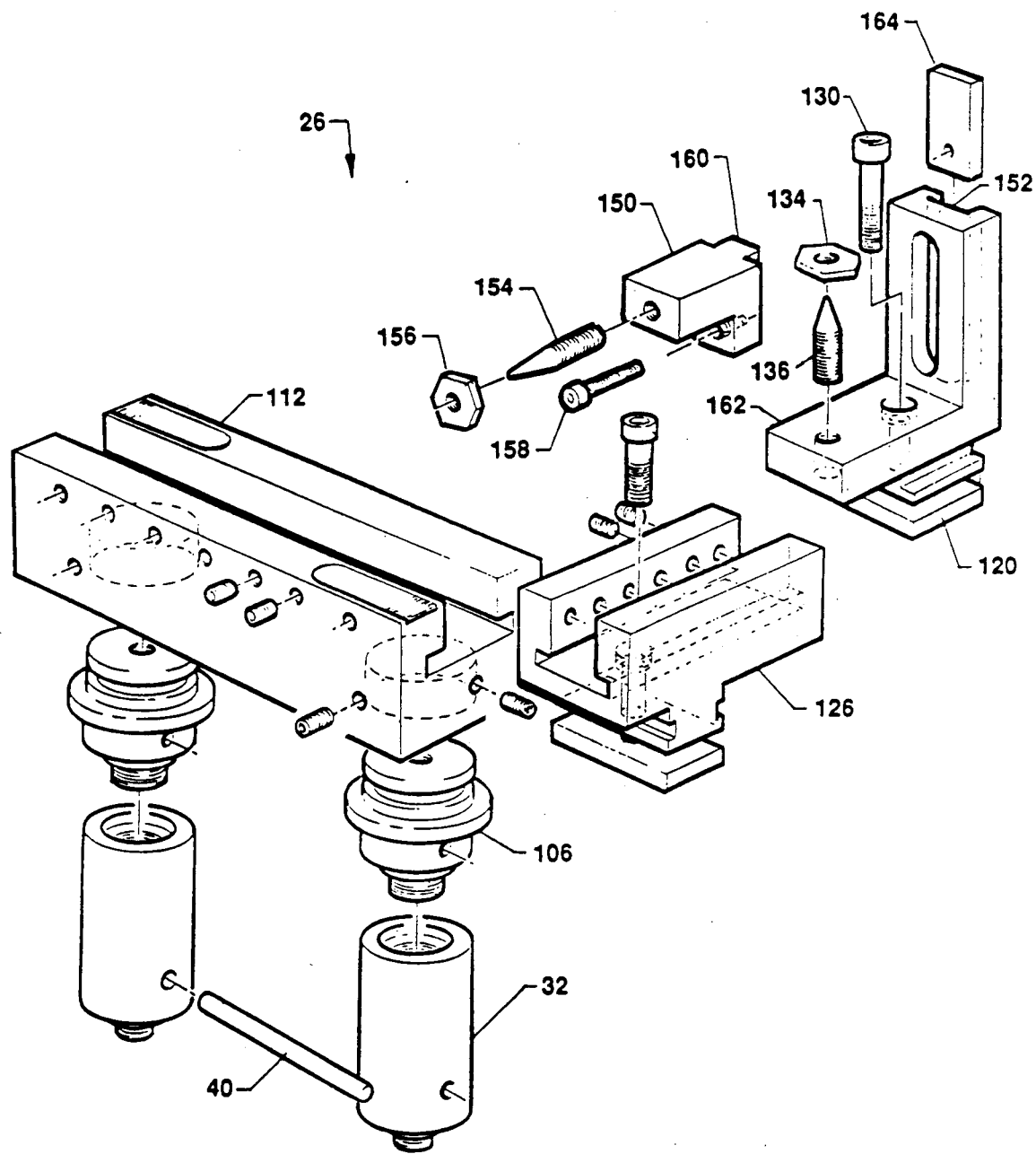
FIG. 6 is an exploded perspective view which illustrates one of the alignment devices which is an A and C datum locator.

Now turning to FIG. 6, A andC datum locator alignment device 26 is shown. Alignment device 26 provides both an A datum supporting function (via tip 136) and a C datum positioning function (via tip 154), as can be seen by FIG. 1. The elements of alignment device 26 are similar to those of alignment device 24 from stanchion 32 to sliding assembly 126. Instead of sliding assembly 128 as in FIG. 5, alignment device 26 has an L-shaped sliding assembly 162, secured in the horizontal dovetail slot 142 as discussed before. Sliding assembly 162 has a vertical retaining slot 152 which secures a vertical sliding member 150 in a variable Z direction. This is accomplished by inserting a tab portion 160 of vertical sliding member 150 into slot 152 as shown. The vertical sliding member 150 is retained in the retaining slot 152 by means of a vertical sliding plate 164 and a bolt 158 as shown. The vertical (A datum) supporting tip 136 is similar to that shown in FIG. 5. A horizontal (C datum) positioning tip 154 is secured into vertical sliding member 150 by a threaded hole and is adjustable therein. The tip 154 is then locked in a desired location by nut 156.

In operation, vertical tip 136 can be used with a clamping alignment device 22 and at the same time tip 154 can be used with an alignment device 30 that pushes against an edge of the workpiece 14 as can be seen in FIG. 1. Once again, extension rod 58 can be used to extend tips 136 and 154 as described above. Also, tips with different end configurations, as described above, can be used.

Figure 7:
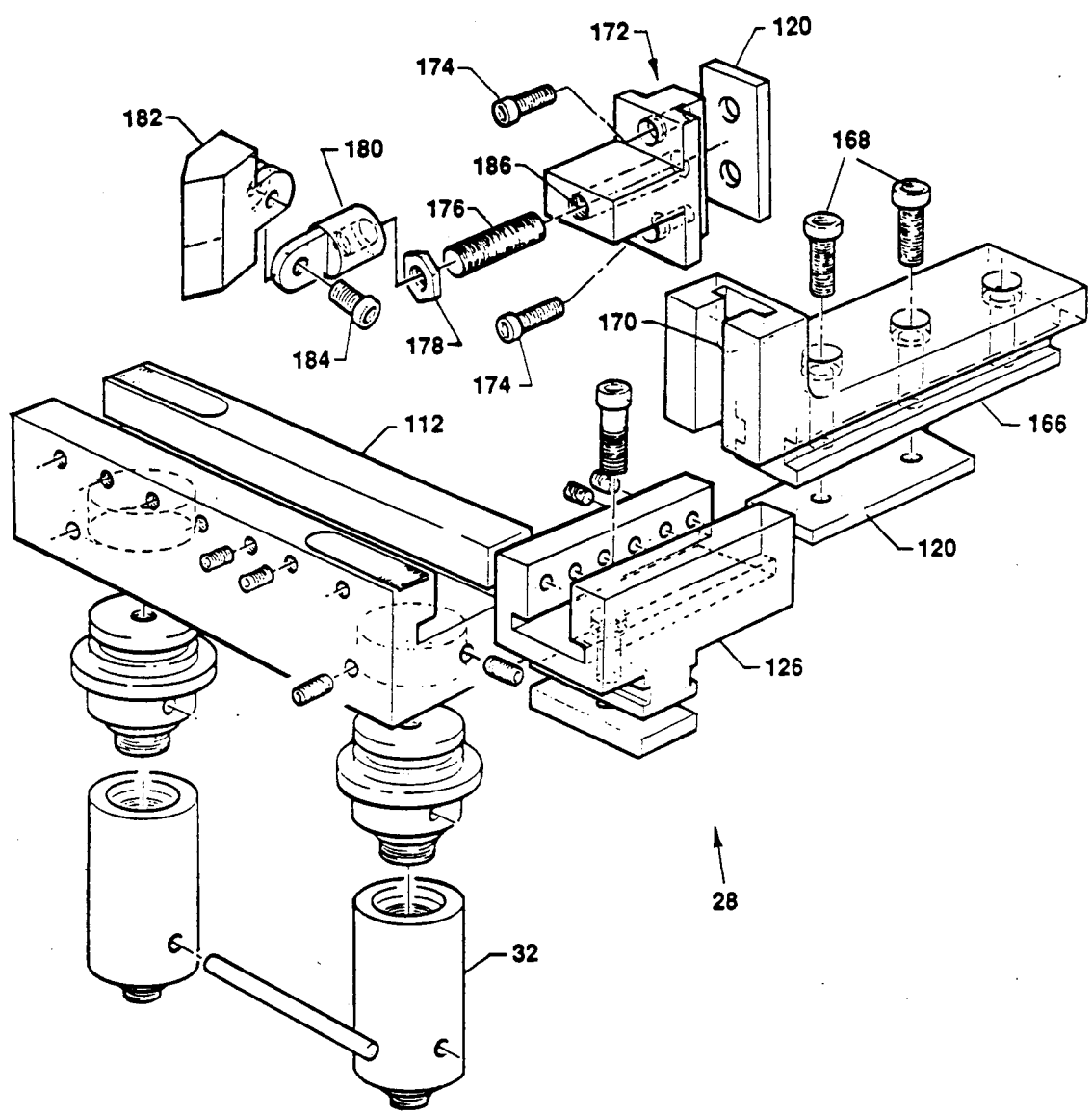
FIG. 7 is an exploded perspective view which illustrates one of the alignment devices which is a B or C datum locator.

Turning now to FIG. 7, B or C datum locator alignment device 28 is shown. The elements from stanchion 32 to the sliding assembly 126 are the same as in FIGS. 5 and 6. Sliding assembly 128 or 162 is now replaced with sliding assembly 166. The sliding assembly 166 is secured into the dovetail slot 142 of sliding assembly 126 by means of bolts 168 in the same fashion as described above. Sliding assembly 166 contains a vertical retaining slot 170 for vertically positioning a sliding assembly 172. Sliding assembly 172 is secured into the vertical retaining slot 170 by means of bolts 174 and sliding plate 120 as described above. A threaded positioning element 176 is inserted into a threaded hole 186 in the sliding assembly 182 as shown and retained in a desired position by nut 178. Connecting element 180 secures a pivotable locating element 182 to the threaded positioning element 176 by means of bolt 184 and a threaded hole into the connecting element 180 as shown.

In operation, pivotable locating element 182 can be secured at a desired location for positioning a workpiece as shown in FIG. 1. As is apparent, locating element 182 can be positioned in all X, Y and Z axes individually from each other. Further, the locating element 182 is pivotable on the tab of the connecting element 180 so as to push against the workpiece at an efficient or desired angle.

Figure 8:
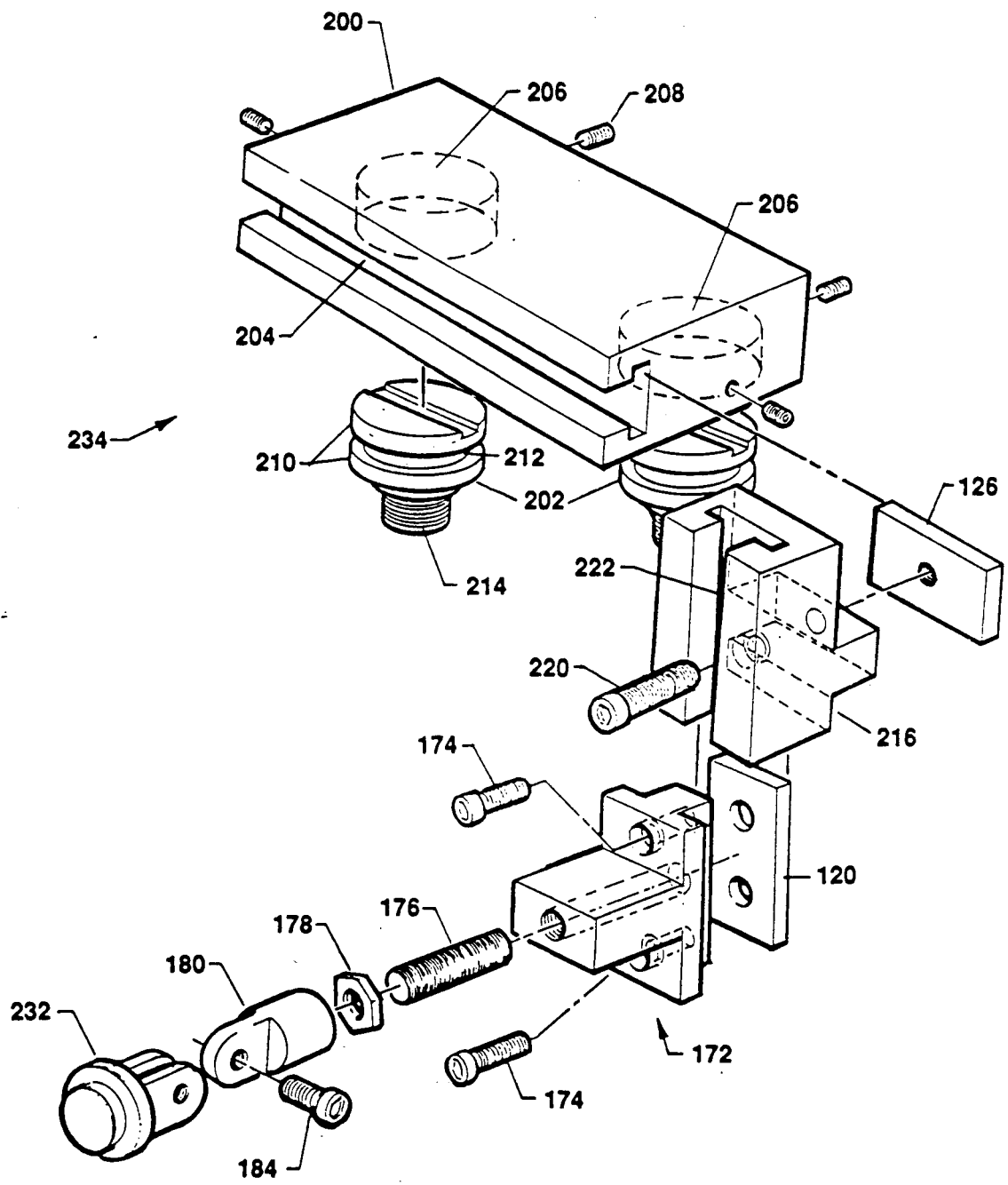
FIG. 8 is an exploded perspective view which illustrates one of the alignment devices which is a flush mounted B or C datum locator.

Now turning to FIG. 8, flush mounted B or C datum locator alignment device 234 is shown which operates in much the same fashion as the alignment device 28 of FIG. 7. This alignment device is used for workpieces which need to be positioned near platform 12. Generally, stanchions 32 are not required for this device. Headers 202 are instead inserted directly into the threaded holes 16 by means of the threaded end portion 214 and the screw drive slot as shown. Once the headers 202 are threaded into hole 16 a bridging member 200 is positioned over the headers 202, such that the headers are inserted into holes 206. The headers 202 are secured in the holes 206 by means of set screws 208 positioned in grooves 212 formed by flanges 210. The bridging member 200 has a dovetailed slot 204 for positioning sliding assembly 216. Sliding assembly 216 is secured by means of bolt 220 and slidign plate 120 as described above. In this alignment device 234, there generally is not a need for using set screws to further secure sliding assembly 216 as described in FIg. 5. Sliding assembly 172, from FIG. 7, is positioned in the dovetail slot 222 of sliding assembly 216 as described in FIG. 7. Pivotable locating head 232 is used in much the same way as the pivotable head 182 of FIG. 7.

The universality of the disclosed alignment devices enables the support and positioning of virtually any size and shape workpiece. FIG. 1 shows only one arrangement of the alignment devices. Virtually every horizontal point above the platform 12 within the vertical range of the alignment devices can be accessed. Moreover, the alignment devices as disclosed are not limited for use with a device for inspection of a workpiece. Further uses include structural testing, assembly and machining processes of workpieces. In addition, the invention employs a modular, building block approach where many of the elements are interchangeable and are commonly used in many different species of the alignment devices. Various modifications of the disclosed alignment devices can be made without departing from the spirit and scope of the invention as set forth in the following claims.

What is claimed is:
1. A workpiece supporting apparatus comprising:
   a platform having a matrix of holes in predetermined locations;
   a plurality of alignment devices, each alignment device being secured in a selected hole and readily moveable and securable from one hole to another such that the relation of said alignment devices to each other is known; and
   said alignment device being adjustable in at least one of three coordinate axes and having a sufficient range of movement to support and position a variety of different workpieces, each alignment device being assembled from a plurality of interchangeable elements, and each alignment device including at least one elongated stanchion having a predetermined length, said elongated stanchion includign means at one end surface thereof for connecting another elongated stanchion thereto along a common axis and at least one stanchion referencing the workpiece relative to the platform, said elongated stanchion is removably connected at its lower end to one of the holes in the platform and carrying another element at its upper end; and
   said plurality of interconnected elements includes an extension element secured to the upper end of the at least one stanchion, said extension element carrying a rotatable member for rotating at least one reference bushing in a plane substantially parallel to the platform, and said reference bushing being movably positionable.

2. The apparatus of claim 1 wherein the rotatable member rotates a clamping device in a plane substantially parallel to a clamping plane. of the workpiece.

3. The apparatus of claim 1 further comprising at least two stanchions, said at least two stanchions being substantially parallel to each other; an element secured to the upper end of both stanchions, said element having a first slot; and a first slidable assembly, said first slidable assembly positionable along the first slot and lockable at any point therein.

4. The apparatus of claim 3 further comprising a second slidable assembly, said second slidable assembly slidably positionable in a second slot in said first slidable assembly and lockable at any point therein]said second slot being substantially perpendicular to said first slot and substantially parallel to said platflrm.

5. The apparatus of claim 4 which further comprises an elongated tip member threadable into said second slidable assembly in a direction substantially perpendicular to the platform.

6. The apparatus of claim 4 wherein said second slidable assembly contains a third slot, said third slot being substantially perpendicular to said platform and carrying a third slidable assembly, said third slidable assembly being positionable and lockable in said third slot and including a threaded elongated member, said threaded elongated member being threadably positionable in said third slidable assembly in a direction substantially parallel to said platform.

7. The apparatus of claim 6 wherein said threaded elongated member positions a contact element in a direction substantially parallel to the platform, said contact element being pivotable on a connecting element, said connecting element being connected to said threaded elongated member.

8. The apparatus of claim 1 wherein at least one of said plurality of alignment devices is adjustable in all three coordinate axes such that an adjustment in one axis does not alter the other two axes.

9. Apparatus for supporting a workpiece comprising:
   a plurality of interconnected elements, at least one element being an elongated stanchion having a central axis, said elongated stanchion including means for connecting said stanchion to at least one other stanchion at its lower end such that a central axis of said other stanchion substantially aligns with the axis of said elongated stanchion, and carrying the remaining elements at its upper end, a first remaining element secured to the upper end of the elongated stanchion, said first element carrying a rotatable member, said rotatable member being rotatable about an axis substantially parallel to but spaced from the central axis of the elongated stanchion, and wherein said rotatable member positions a second remaining element in a plane substantially perpendicular to the substantially parallel axis without substantially deviating from the plane, said second remaining element being rotatable about an axis substantially perpendicular to the substantially parallel axis for positioning a third remaining element about the substantially perpendicular axis and at least one member having a slot, said one member being positionable by said rotatable member, and means for positioning another element along said slot.

10. The apparatus of claim 9 wherein the rotatable member is connected to a clamping device.

11. Apparatus for supporting a workpiece comprising:
a plurality of interconnected elements, at least two of the elements being coupling elements, said coupling elements including means for removably securing said coupling elements to at least one support device at their lower ends and means for removably securing said coupling elements to a single briding member at their upper ends, said bridging member being removably secured to said coupling elements at a bottom surface of said briding member, and said bridging member including a first slot and a first slidable assembly, said first slidable assembly being positionable along said first slot and lockable at any point therein and said first slidable assembly being removable from said first slot.

12. The apparatus of claim 11 further comprising a second slidable assembly, said second slidable assembly being positionable along a second slot in said first slidable assembly and lockable at any point herein, said second slot being substantially perpendicular to said first slot.

13. The apparatus of claim 12 wherein said second slidable assembly comprises an elongated member threadable into said second slidable assembly in a direction substantially perpendicular to both the first and second slots.

14. The apparatus of claim 12 wherein said second slidable assembly contains a third slot, said third slot being substantially perpendicular to the first and second slots and having a third slidable assembly therein, said third slidable assembly being positionable and rockable along said third slot, a threaded elongated member1 said threaded elongated member being threadably positionable in said third slidable assembly in a direction substantially parallel to said second slot.

15. The apparatus of claim 14 wherein said threaded elongated member includes a connecting element at one end, said connecting element connecting said threaded elongated member to a contact element, said contact element being pivotable on said connecting element, wherein said threaded elongated member positions said contact element in a direction substantially parallel to the secondslot.

16. The apparatus of claim 13 wherein said elongated member includes a connecting element, at one end, said connecting element connecting said elongated member to a contact element pivotable on said connecting element, wherein said elongated member positions said contact element in a direction substantially perpendicular to both the first and second slots.

17. The apparatus of claim 11 wherein said at least one support device is at least two stanchions, said at least two stanchions being substantially to each other and connected to each of the coupling elements, and each stanchion further comprising means to connect each stanchion, at their lower ends, to another stanchion or another support device.

18. Apparatus for supporting a workpiece comprising:
at least two elongated stanchion elements, each stanchion element having an internal threaded bore at one end and an external threaded tip portion at the other end and wherein the tip portion of one stanchion element is threaded into the internal bore of another stanchion element and wherein said at least two stanchions are interchangeable;
an end cap element, said end cap element having an internal threaded bore at one end and an external threaded tip portion at the other end, said threaded tip portion of said end cap threaded into the internal threaded bore of one of the at least two stanchion elements; and
a tip element, said tip element having an external threaded portion, said external portion threaded into the internal threaded bore of the end cap and including a nut for securing said tip element into said internal threaded bore of the end cap at a predetermined location.

* * * * *

UNITED STATES PATENT AND TRADEMARK OFFICE
CERTIFICATE OF CORRECTION

PATENT NO. : 5,026,033

DATED : June 25, 1991

INVENTOR(S) : Frank W. Roxy

It is certified that error appears in the above-identified patent and that said Letters Patent is hereby corrected as shown below:

Col. 3, line 29, "contaot" should be --contact--.
Col. 4, line 20, "twb" should be --two--.
Col. 4, line 20, after "together" insert --,--.
Col. 4, line 47, "compbnents" should be --components--.
Col. 4, line 50, after "58" (first occurrence) insert --,--.
Col. 4, line 62, "rotaing" should be --rotating--.
Col. 5, line 1, "isgenerally" should be --is generally--.
Col. 5, line 15, "memeber" should be --member--.
Col. 5, line 19, "alonq" should be --along--.
Col. 5, line 26, "128" should be --128--.
Col. 5, line 29, "Vertioal" should be --Vertical--.
Col. 5, line 29-30, "supportinq" should be --supporting--.
Col. 5, line 31, "distanoe" should be --distance--.
Col. 5, line 31, "looked" should be --locked--.
Col. 5, line 48, "flange" should be --flanges--.
Col. 5, line 51, "grcove" should be --groove--.
Col. 5, line 54, "136in" should be --136 in--.
Col. 5, line 58, "provided" should be --provides--.

UNITED STATES PATENT AND TRADEMARK OFFICE
CERTIFICATE OF CORRECTION

PATENT NO. : 5,026,033

DATED : Jun. 25, 1991

INVENTOR(S) : Frank W. Roxy

It is certified that error appears in the above-identified patent and that said Letters Patent is hereby corrected as shown below:

Col. 6, line 31, "adjustible" should be --adjustable--.
Col. 6, line 55, "182" should be --172--.
Col. 7, line 17, "slidign" should be --sliding--.
Col. 7, line 20, "FIg." should be --FIG.--.
Col. 7, line 58, "includign" should be --including--.
Col. 8, line 7, after "plane" delete ".".
Col. 8, line 18, "therein]said" should be --therein, said--.
Col. 8, line 20, "platflrm" should be --platform--.
Col. 9, line 13, "briding" should be --bridging--.
Col. 9, line 15, "briding" should be --bridging--.
Col. 9, line 24, "herein" should be --therein--.
Col. 9, line 25, "tosaid" should be --to said--.
Col. 9, line 36, "rockable" should be --lockable--.
Col. 9, line 37, "member1" should be --member,--.
Col. 10, line 6, "secondslot" should be --second slot--.
Col. 10, line 16, after "substantially" insert --parallel--.
Col. 10, line 26, after "end" delete "and".

Signed and Sealed this

Nineteenth Day of October, 1993

*Attest:*

BRUCE LEHMAN

*Attesting Officer*     *Commissioner of Patents and Trademarks*